Patented Feb. 24, 1953

2,629,746

UNITED STATES PATENT OFFICE 2,629,746

PROCESS OF PRODUCING PENTAERYTHRITOL

Richard F. B. Cox, Wilmington, Del., assignor to Hercules Powder Company, Wilmington, Del., a corporation of Delaware No Drawing. Application June 12, 1948, Serial No. 32,737

1 Claim. (Cl. 260—635)

This application is a continuation-in-part of my copending application Serial Number 459,709, filed September 25, 1942, and now abandoned.

This invention relates to an improved process for the preparation of pentaerythritol. More particularly, it is concerned with an improved process for recovering pentaerythritol from a crude reaction mixture obtained by the alkaline condensation of acetaldehyde and formaldehyde.

Pentaerythritol is prepared commercially by condensation of acetaldehyde with formaldehyde in an aqueous medium in the presence of an alkaline catalyst such as Ca(OH)$_2$, NaOH, etc. In the resulting reaction mixture there is present in addition to the pentaerythritol a metal salt of formic acid, the particular salt depending upon the catalyst employed. Thus, calcium formate is present when Ca(OH)$_2$ is used as catalyst. In practice, the reaction mixture is often treated with an acid precipitant to precipitate the catalyst cations. This practice yields an aqueous solution comprising pentaerythritol and free formic acid. Thus, when Ca(OH)$_2$ is used as catalyst, the calcium ions may be removed, for example, by precipitating the same as the sulfate, oxalate, etc. The resulting solution is an aqueous solution comprising pentaerythritol and free formic acid. In working up the aqueous pentaerythritol-formic acid solution, it has been the practice to concentrate the same to a point at which crystallization of the pentaerythritol takes place and to recover crystalline pentaerythritol in this manner. The yield of recovered crystalline pentaerythritol, however, is always substantially below the theoretical.

Now, in accordance with this invention, a method has been found for recovering substantially higher yields of crystalline pentaerythritol from a crude pentaerythritol reaction mixture containing pentaerythritol and free formic acid. The novel step in this new method consists in extracting formic acid from the formic acid-containing reaction mixture with a formic acid solvent which is substantially water-immiscible and nonsolvent for the pentaerythritol. The formic acid is extracted from the reaction mixture prior to the application of heat to concentrate the reaction mixture by evaporation. The employment of this technique avoids formation of noncrystalline syrups during the concentration step. Such noncrystalline syrups seriously interfere with the crystallization of pentaerythritol. The overall result of the use of the technique of this invention is a substantially increased yield of recovered crystalline pentaerythritol.

The process to which this invention relates may broadly be described as involving condensation of acetaldehyde with formaldehyde in an aqueous medium in the presence of an alkaline catalyst to form a reaction mixture comprising pentaerythritol and the formate of the catalyst cation, converting said reaction mixture to an aqueous solution comprising pentaerythritol and free formic acid by addition of a substance yielding hydrogen ions in an amount at least chemically equivalent to the formate present, extracting formic acid from said solution with a formic acid solvent substantially water-immiscible and nonsolvent for the pentaerythritol, applying heat to evaporate said extracted solution at least to a point at which crystallization takes place, and recovering crystalline pentaerythritol.

The recovery procedure will vary somewhat depending upon the composition of the solution subjected to evaporation. Thus, when an acid which is a precipitant for the catalyst cations is employed in accordance with this invention, for example, oxalic acid in the case of calcium cations, the solution subjected to evaporation is substantially free of salts. Pentaerythritol can be recovered from such a solution by evaporation to a point at which crystallization of pentaerythritol takes place, and succeeding crops of pentaerythritol can be obtained by further evaporations. If desired, the solution may be evaporated to dryness as for example by spray drying. However, when a substance which yields hydrogen ions but which does not precipitate the catalyst cations is employed, then salts will be present in the solution subjected to evaporation, and the pentaerythritol can be recovered by fractional crystallization. If desired, the solution may be evaporated to dryness to yield a mixture of pentaerythritol and salt which can then be resolved.

When free formic acid is permitted to remain in the pentaerythritol reaction mixture, it appears to react with pentaerythritol to form a pentaerythritol formate during the concentration step, i. e., when heat is applied to concentrate the reaction mixture by evaporation. Furthermore, it is believed that the formic acid acts as a catalyst for the condensation of pentaerythritol and any unreacted aldehydes which may be present in the reaction mixture. All of these products which may result due to the presence of formic acid consume pentaerythritol and have an adverse affect on the economies of the reaction. These by-products, moreover, due to their noncrystalline, syrupy nature interfere seriously with the recovery of the desired product, pentaerythritol.

Now, having indicated in a general way the nature and purpose of the invention, the following examples are illustrative of the invention but are not to be construed as limiting the same. In the examples, the parts and percentages are by weight unless otherwise indicated.

*Example 1*

22 parts of acetaldehyde and 20 parts of calcium hydroxide were added simultaneously with agitation to 175 parts of Formalin (35% formaldehyde) and 370 parts of water. After 6 hours had elapsed, the reaction was considered to be complete. During this period, the temperature of the reaction mixture varied from 18° C. to 41° C. At the end of the reaction period, the reaction mixture was acidified with 47 parts of aqueous 50% sulfuric acid. Precipitated calcium sulfate was removed by filtration, and the precipitate was given a displacement wash with hot water. The combined filtrate and wash water was then treated with a small amount of oxalic acid to remove additional calcium not precipitated by the sulfuric acid, and the precipitated calcium oxalate was filtered from the solution. The clear, colorless solution of pentaerythritol and formic acid was then extracted with ethyl acetate to substantially completely remove the free formic acid. The resulting solution of pentaerythritol was then concentrated in vacuo (50° C. pot temperature) to a point at which pentaerythritol crystallized out upon cooling to room temperature. After removal of the first crop of pentaerythritol, the solution was again concentrated in vacuo to get further crops of pentaerythritol crystals. The last crop of pentaerythritol was obtained by adding ethyl alcohol to the concentrate. Pentaerythritol can be separated from the noncrystalline syrups in this manner due to the fact that it is relatively insoluble in ethyl alcohol whereas the noncrystalline syrups are soluble. The total yield of pentaerythritol thus obtained amounted to 54 parts by weight. This amounted to a yield of 80% by weight based on the acetaldehyde.

*Example 2*

This example represents a modification of the process of Example 1 wherein the crude pentaerythritol reaction mixture is subjected to a preliminary processing to separate pentaerythritol and calcium formate from the noncrystalline syrups which are formed during the initial condensation step. Once the mixture of pentaerythritol and calcium formate crystals has been separated from the crude reaction mixture, this mixture is dissolved in water to provide an aqueous solution comprising pentaerythritol and calcium formate which can be subjected to the process with which this invention is concerned. The example was carried out as follows:

11 parts of acetaldehyde and 9.5 parts of calcium hydroxide were added simultaneously with agitation to 90 parts of Formalin (35% formaldehyde) and 200 parts of water. The reaction was carried out under substantially the same conditions as those given in Example 1. At the end of the 6 hour reaction period, the reaction mixture was filtered to remove lime and other insoluble material. The filtrate was then concentrated in vacuo (50° C. pot temperature) to a point at which the concentrate upon cooling to room temperature yielded crystals of pentaerythritol and calcium formate. This procedure was repeated until 5 crops of crystals had been obtained. Ethyl alcohol was added to the final filtrate to separate an additional crop of pentaerythritol and calcium formate from the alcohol-soluble noncrystalline syrups. The total of crystalline pentaerythritol and calcium formate separated in accordance with the above procedure amounted to 46 parts.

The pentaerythritol-calcium formate crystalline mixture was dissolved in 100 parts of water and acidified with 25 parts of aqueous 50% sulfuric acid. The precipitated calcium sulfate was removed by filtration, and the precipitate washed with water. The combined filtrate and wash water were then extracted with 6 portions of ethyl ether equal in volume to the aqueous solution to remove formic acid. The aqueous solution thus freed of formic acid was concentrated in vacuo (pot temperature 50° C.) to a point at which pentaerythritol crystals formed upon cooling of the concentrate to room temperature. Additional crops of crystals were obtained by further concentration and crystallization. The last of the pentaerythritol was removed from the mother liquor by the addition of ethyl alcohol. The total yield of pentaerythritol obtained was 28 parts. This amounted to an 80% yield based on the acetaldehyde.

The conditions employed in effecting the condensation of formaldehyde and acetaldehyde to yield pentaerythritol may be varied widely in accordance with the knowledge of the art. Thus, although calcium hydroxide has been used in the examples, alkaline catalysts such as sodium hydroxide, potassium hydroxide, barium hydroxide, magnesium hydroxide, strontium hydroxide, etc. may be employed. The formaldehyde-acetaldehyde molar ratio used may be varied in accordance with the teachings of the art. These factors and numerous others relate specifically to the condensation step of the overall process. The subject invention, however, is not limited to any particular procedure or procedures for effecting condensation, and accordingly any crude reaction mixture resulting from any prior art process may be employed in carrying out this invention. The crude reaction mixture will in an any event comprise pentaerythritol and the metal formate corresponding to the catalyst employed in the condensation.

It is essential in accordance with this invention that the crude reaction mixture be converted to an aqueous solution comprising pentaerythritol and free formic acid by addition of a substance yielding hydrogen ions in an amount at least chemically equivalent to the metal formate present. Any acid which precipitates the catalyst cations may be used. For example, assume a reaction mixture comprising pentaerythritol and calcium formate. If sulfuric acid is added in an amount slightly in excess of the amount which is chemically equivalent to the formate, calcium sulfate will precipitate out. The resulting solution will be one containing pentaerythritol and free formic acid. Similarly, oxalic acid may be employed in place of sulfuric acid.

It is not necessary to employ an acid substance which precipitates the metal ion present. Thus, hydrochloric acid may be added in an amount slightly in excess of the amount which is chemically equivalent to the formate present. In this case, the resulting solution will contain free formic acid which can be extracted with a selective solvent for formic acid. Other acids may be employed in place of hydrochloric acid, for example, mineral acids such as hydrobromic acid, phosphoric acid, sulfuric acid, etc. Similarly, various cation exchange agents may be employed to convert the crude reaction mixture comprising pentaerythritol and the metal formate to an aqueous solution comprising pentaerythritol and free formic acid. For example, sulfonated polyhydroxybenzene-formaldehyde resin may be employed as a cation exchange agent to remove the calcium ion from a crude pentaerythritol reaction mixture and to provide an aqueous solution comprising pentaerythritol and free forming acid. In those cases wherein an acid substance which does not precipitate the catalyst cations is employed, it is desirable that the acid substance be comparatively less soluble in the solvent employed to extract formic acid than in the aqueous reaction mixture.

It is generally desirable, although not absolutely necessary, to remove the catalyst cations at some time prior to the concentration step. If the catalyst cations are not removed prior to this step, the solution subjected to evaporation will contain a salt of the catalyst cation and pentaerythritol, and the recovery of pentaerythritol will be complicated due to the presence of the salt. The most satisfactory procedure from the standpoint of efficiency is to effect the conversion of the reaction mixture to an aqueous solution comprising pentaerythritol and free formic acid by addition of an acid which precipitates the catalyst cations.

One having converted the crude pentaerythritol reaction mixture to an aqueous solution comprising pentaerythritol and free formic acid, the latter is extracted with a substance which is a liquid at the extraction temperature. This liquid must be a solvent for formic acid, and it must be substantially water-immiscible and non-solvent for the pentaerythritol. The substance employed must be unreactive with pentaerythritol and unreactive with formic acid under extraction conditions. Thus, aliphatic ketones such as ethyl butyl ketone, ethyl propyl ketone, methyl propyl ketone, diethyl ketone, etc.; aliphatic acetates such as ethyl, propyl, butyl, amyl, hexyl, etc. acetates; and aliphatic ethers such as diethyl ether, diisopropyl ether, etc. are particularly satisfactory. Numerous substances other than those specifically mentioned can be employed as extractants in accordance with this invention if they possess the aforementioned characteristics. Whether or not any particular substance possesses these characteristics can be easily ascertained by one skilled in this art by resort to simple testing. The extraction process may be of the continuous or batch type.

The improved process for manufacturing pentaerythritol described herein is advantageous in that it provides a substantial increase in yield of product. This process also avoids formation of noncrystalline syrups during the concentration step. These syrups seriously interfere with and prolong the recovery of crystalline pentaerythritol.

What I claim and desire to protect by Letters Patent is:

The process for producing pentaerythritol which comprises condensing acetaldehyde with formaldehyde in an aqueous medium in the presence of calcium hydroxide as catalyst to form a reaction mixture comprising pentaerythritol and calcium formate, converting said reaction mixture to an aqueous solution comprising pentaerythritol and formic acid by addition of an acid which precipitates the calcium cations in an amount sufficient to substantially completely precipitate said calcium cations, the resulting precipitate being separated from said solution at some time prior to the ensuing evaporation step, extracting formic acid from said solution with ethyl ether, applying heat to evaporate said extracted solution at least to a point at which crystallization of pentaerythritol takes place, and recovering crystalline pentaerythritol.

RICHARD F. B. COX.

REFERENCES CITED

The following references are of record in the file of this patent:

UNITED STATES PATENTS

| Number | Name | Date |
|---|---|---|
| 1,716,110 | Burke | June 4, 1929 |
| 1,930,146 | Othmer | Oct. 10, 1933 |
| 2,107,527 | Evans et al. | Feb. 8, 1938 |

FOREIGN PATENTS

| Number | Country | Date |
|---|---|---|
| 736,379 | France | Nov. 23, 1932 |

OTHER REFERENCES

Chimie et Industrie (Des vergnes), vol. 29, pp. 1263–67 (1933).